United States Patent [19]
Sasaki

[11] Patent Number: 5,357,925
[45] Date of Patent: Oct. 25, 1994

[54] INTERNAL COMBUSTION ENGINE

[75] Inventor: Shizuo Sasaki, Numazu, Japan

[73] Assignee: Toyota Jidosha Kabushika Kaisha, Toyoto, Japan

[21] Appl. No.: 186,084

[22] Filed: Jan. 25, 1994

Related U.S. Application Data

[63] Continuation of Ser. No. 942,531, Sep. 9, 1992, Pat. No. 5,291,865.

[30] Foreign Application Priority Data

Sep. 13, 1991 [JP] Japan .................. 3-234954

[51] Int. Cl.$^5$ ................................ F02B 3/00
[52] U.S. Cl. ........................ 123/298; 123/308; 123/431
[58] Field of Search ............... 123/298, 302, 305, 308, 123/431, 432

[56] References Cited

U.S. PATENT DOCUMENTS

| | | | |
|---|---|---|---|
| 2,800,118 | 7/1957 | Scherenbert | 123/298 |
| 2,986,129 | 5/1961 | Henry-Biabaud | 123/298 |
| 3,154,059 | 10/1964 | Witzky et al. | 123/32 |
| 3,924,598 | 12/1975 | Davis | 123/431 |
| 4,031,867 | 6/1977 | Yasuda et al. | 123/431 |
| 4,080,949 | 3/1978 | Brinkman | 123/431 |
| 4,765,297 | 9/1988 | Richter | 123/432 |
| 4,856,473 | 9/1989 | Kawai et al. | 123/308 |
| 4,957,081 | 9/1990 | Ito et al. | 123/302 |
| 5,063,886 | 11/1991 | Kanaman et al. | 123/299 |
| 5,127,371 | 7/1992 | Ito | 123/300 |
| 5,127,379 | 7/1992 | Kobayashi et al. | 123/302 |
| 5,140,958 | 8/1992 | Kobayashi et al. | 123/302 |
| 5,170,759 | 12/1992 | Ito | 123/300 |

FOREIGN PATENT DOCUMENTS

| | | |
|---|---|---|
| 0299385 | 1/1989 | European Pat. Off. |
| 3444356 | 6/1985 | Fed. Rep. of Germany |
| 4029572 | 4/1991 | Fed. Rep. of Germany |
| 0151213 | 11/1981 | Japan |
| 0036721 | 2/1985 | Japan |
| 6193229 | 9/1986 | Japan |
| 1173416 | 12/1989 | Japan |

*Primary Examiner*—E. Rollins Cross
*Assistant Examiner*—Erick Solis
*Attorney, Agent, or Firm*—Kenyon & Kenyon

[57] ABSTRACT

An engine comprising a first intake valve and a second intake valve that are arranged on each side of a plane including the axis of the cylinder of the engine. A first intake passage and a second intake passage are connected to the combustion chamber via the first intake valve and the second intake valve, respectively and extend along the plane in the same direction. A first fuel injector is arranged in the combustion chamber to inject fuel toward a region of the combustion chamber, which is located on the first intake valve side of the plane. A second fuel injector is arranged in the second intake passage to inject fuel into the second intake passage.

14 Claims, 13 Drawing Sheets

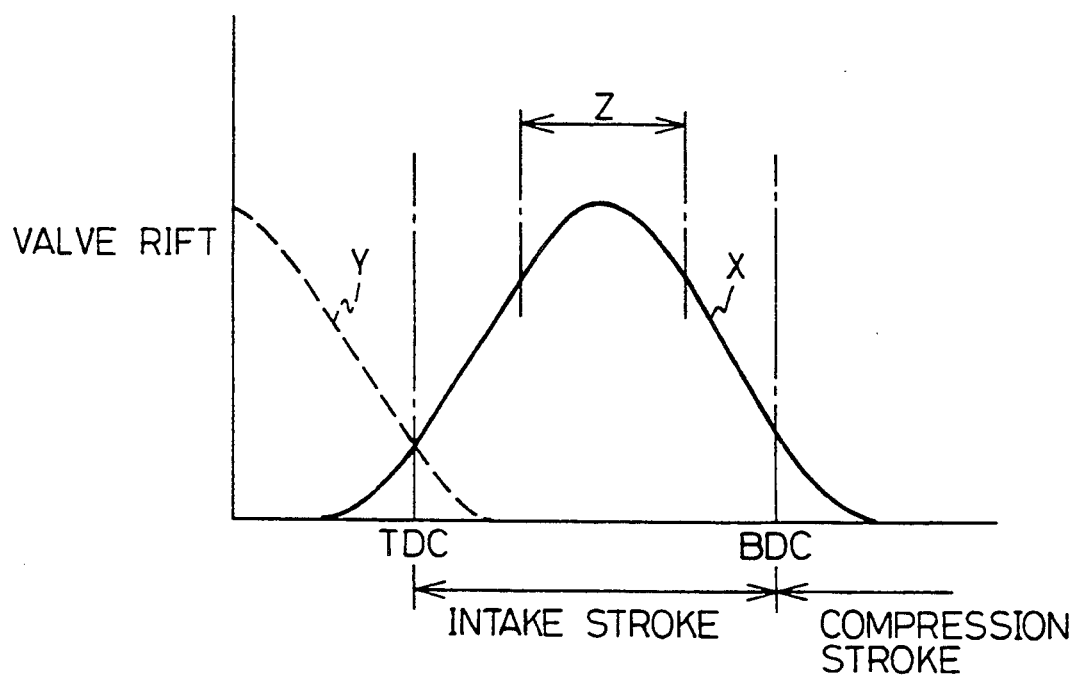

Fig. 15

$$\begin{array}{cccc} Q_{11} & Q_{12} & - - - - & Q_{1m} \\ Q_{21} & & & \\ \vdots & & & \vdots \\ Q_{n1} & - - - - - & Q_{nm} \end{array}$$

(axes: N vertical, L horizontal)

INTERNAL COMBUSTION ENGINE

This application is a continuation of application Ser. No. 07/942,531, filed on Sep. 9, 1992, now U.S. Pat. No. 5,291,865.

BACKGROUND OF THE INVENTION

1. Field of the Invention

The present invention relates to an internal combustion engine.

2. Description of the Related Art

In an engine proposed by the same applicant, a first fuel injector is arranged in the combustion chamber, and a second fuel injector is arranged in the intake port of the engine. An air-fuel mixture is formed in the combustion chamber by both fuel injected into the combustion chamber by the first fuel injector and by fuel injected into the intake port by the second fuel injector.

However, when the fuel is simply injected into the combustion chamber by the first fuel injector, if the fuel injected by the first fuel injector and the fuel injected by the second fuel injector are collected in the same region in the combustion chamber, the air-fuel mixture formed in the region in which both fuels are collected becomes rich, and the air-fuel mixture formed in the other region becomes lean. As a result, a problem arises in that good combustion cannot be obtained.

SUMMARY OF THE INVENTION

An object of the present invention is to provide an engine capable of obtaining good combustion even if fuel is injected into both the combustion chamber and the intake port.

According to the present invention, there is provided an engine comprising: a first intake valve and a second intake valve that are arranged on each side of a plane including an axis of a cylinder of the engine; a first intake passage and a second intake passage that are connected to a combustion chamber of the engine via the first intake valve and the second intake valve, respectively, and extend along the plane in the same direction; a first fuel injector arranged in the combustion chamber that injects fuel toward a region of the combustion chamber, which is located on the first intake valve side of the plane; and a second fuel injector arranged in the second intake passage that injects fuel into the second intake passage.

The present invention may be more fully understood from the description of a preferred embodiment of the invention set forth below, together with accompanying drawings.

BRIEF DESCRIPTION OF THE DRAWINGS

In the drawings:

FIG. 8 is a view illustrating the amount of lift of the intake valve and the exhaust valve;

FIG. 15 is a view illustrating the map of injection time.

DESCRIPTION OF A PREFERRED EMBODIMENT

Figure 1:
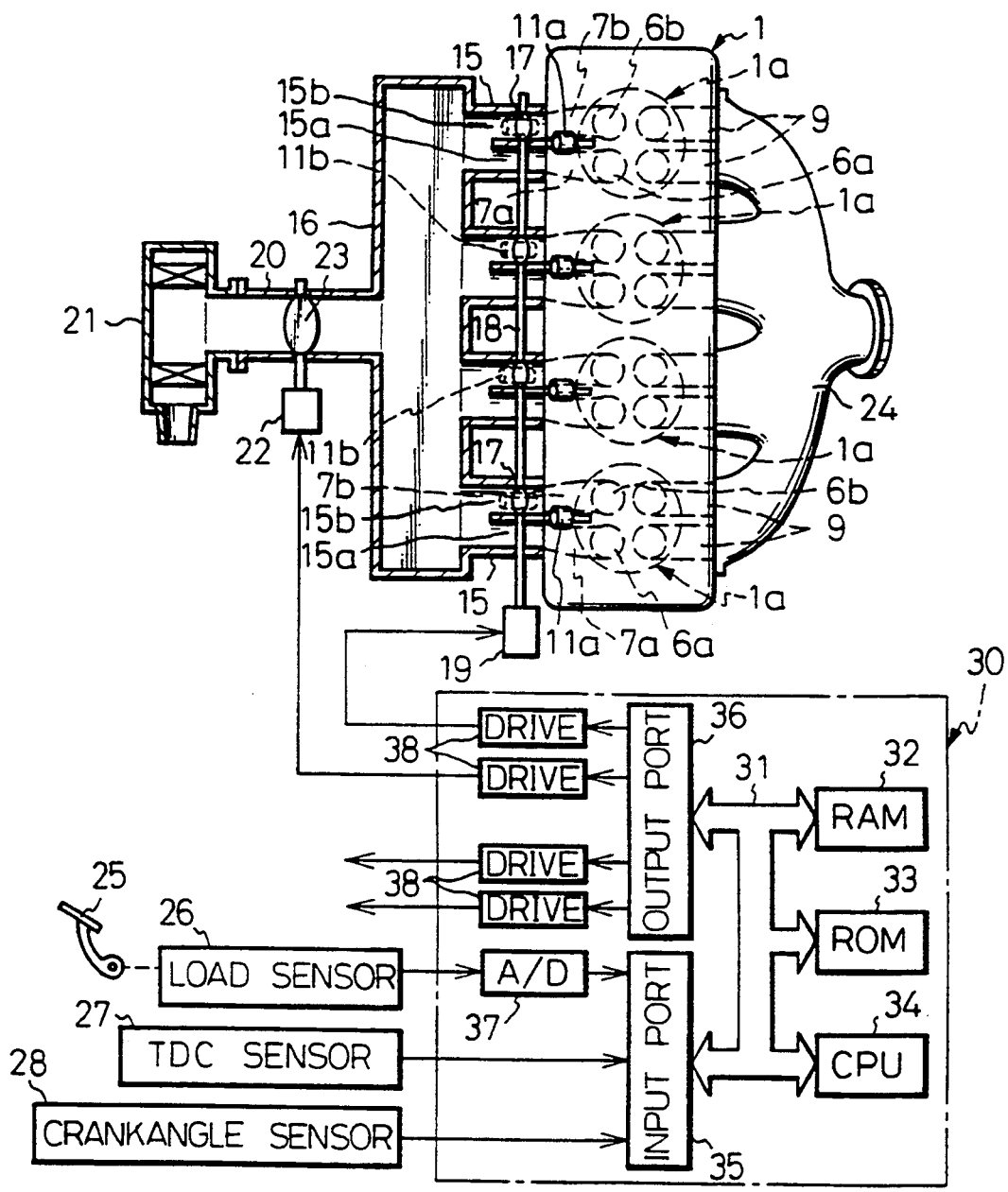
FIG. 1 is a general view of an engine.

Referring to FIG. 1, an engine body 1 comprises four cylinders 1a, and the construction of the cylinders 1a is illustrated in FIGS. 2 through 6.

Referring to FIGS. 2 through 6, reference numeral 2 designates a cylinder block, 3 a piston reciprocally movable in the cylinder block 2, 4 a cylinder head fixed to the cylinder block, and 5 a combustion chamber formed between the piston 3 and the cylinder head 4; 6a designates a first intake valve, 6b a second intake valve, 7a a first intake port, and 7b a second intake port; 8 designates a pair of exhaust valves, and 9 a pair of exhaust ports.

Figure 2:
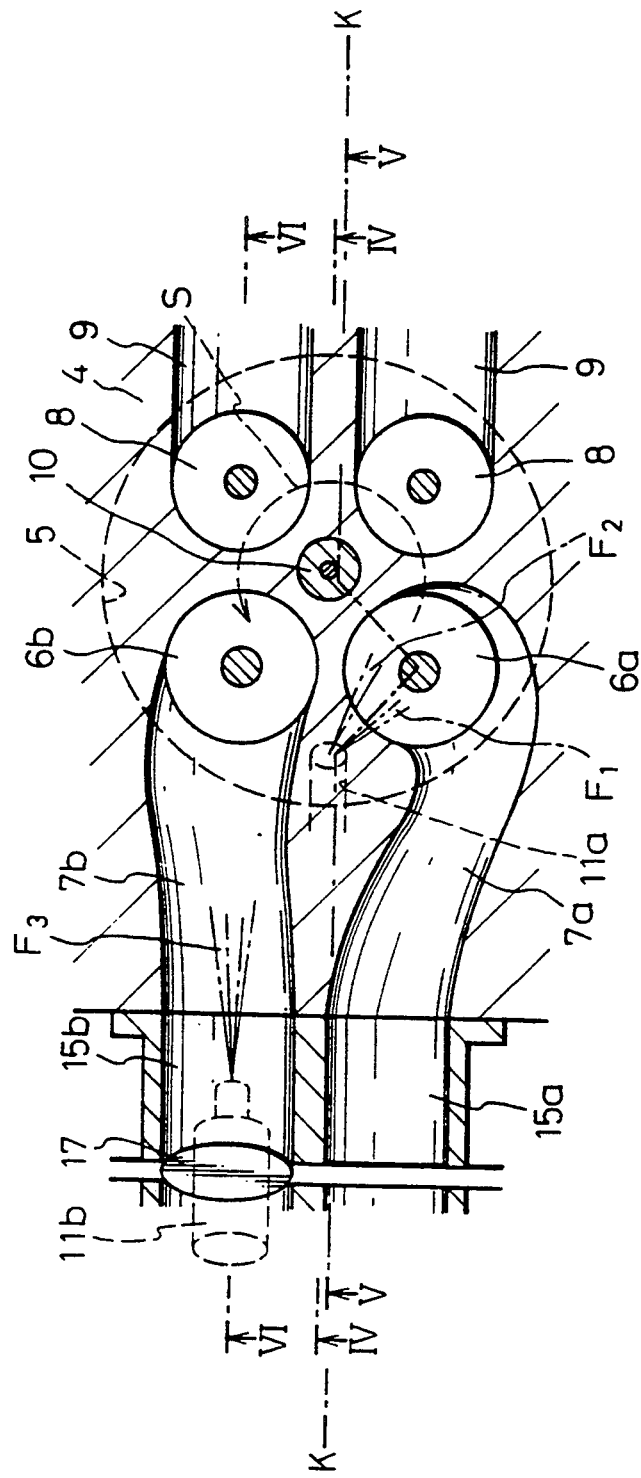
FIG. 2 is a cross-sectional plan view of a cylinder head.

As illustrated in FIG. 2, the first intake valve 6a and the second intake valve 6b are arranged on opposite sides of the plane K—K including the cylinder axis and extend in the same direction along the plane K—K. In addition, as illustrated in FIG. 2, the first intake port 7a is constructed as a helical port, and the second intake port 7b is constructed as a substantially straight extending straight port. Furthermore, as illustrated in FIG. 2, a spark plug 10 is arranged at the central portion of the inner wall of the cylinder head 4, and a first fuel injector 11a is arranged on the peripheral portion of the inner wall of the cylinder head 4 near the first intake valve 6a and the second intake valve 6b.

Figure 3:
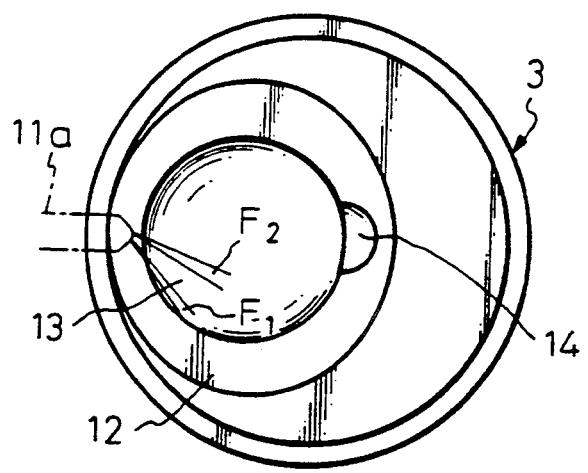
FIG. 3 is a plan view of the top face of a piston.
Figure 4:
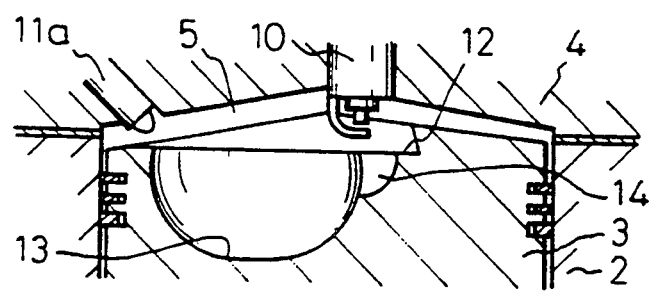
FIG. 4 is a cross-sectional view of the engine taken along the line IV—IV in FIG. 2.
Figure 5:
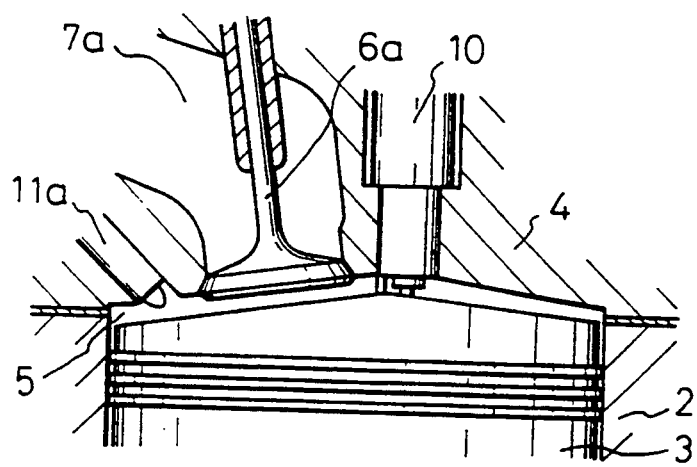
FIG. 5 is a cross-sectional view of the engine taken along the line V—V in FIG. 2.

As illustrated in FIGS. 3 and 4, a shallow dish portion 12 having a substantially circular shaped contour and extending from a point beneath the first fuel injector 11a to a point beneath the spark plug 10 is formed on the top face of the piston 3, and a deep dish portion 13 having a substantially semi-spherical shape is formed on the central portion of the shallow dish portion 12. In addition, a recessed portion 14 having a substantially spherical shape is formed on the connecting portion of the shallow dish portion 12 and the deep dish portion 13 beneath the spark plug 10.

Figure 6:
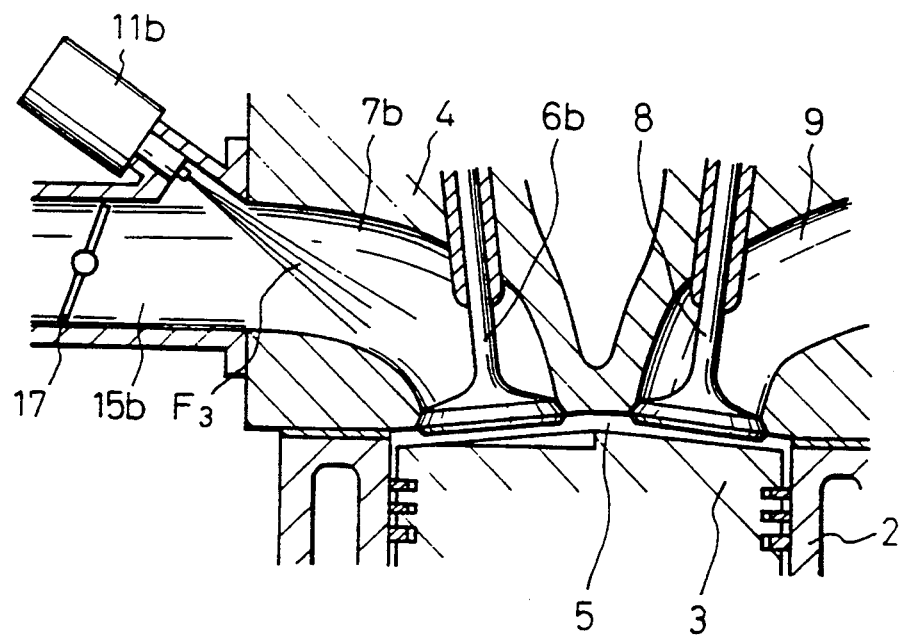
FIG. 6 is a cross-sectional side view of the engine taken along the line VI—VI in FIG. 2.

As illustrated in FIG. 1, the first intake port 7a and the second intake port 7b of each cylinder 1a are connected to a surge tank 16 via a first intake passage 15a and a second intake passage 15b formed in a branch pipe 15, respectively and, as illustrated in FIGS. 1, 2 and 6, a second fuel injector 11b and an intake control valve 17 are arranged in each second intake passage 15b. The intake control valves 17 are connected, via a common shaft 18, to an actuator 19 formed by, for example, a step motor. This step motor 19 is actuated on the basis of a signal output from an electronic control unit 30. The surge tank 16 is connected to an air cleaner 21 via an intake duct 20, and a throttle valve 23 driven by a step motor 22 is arranged in the intake duct 20. The throttle valve 23 is closed to some extent only when the engine load is extremely low, and the throttle valve 23 is maintained at a fully open position when the engine load becomes slightly high. The exhaust ports 9 of all the cylinders 1a are connected to an exhaust manifold 24.

The electronic control unit 30 is constructed as a digital computer and comprises a RAM (random access memory) 32, a ROM (read only memory) 33, a CPU (microprocessor etc.) 34, an input port 35 and an output port 36. The RAM 32, the ROM 33, the CPU 34, the input port 35 and the output port 36 are interconnected via a bidirectional bus 31. A load sensor 26 producing an output voltage that is proportional to the depression of the accelerator pedal 25 is connected to the accelerator pedal 25, and the output voltage of the load sensor 26 is input into the input port 35 via an AD converter 37. A TDC sensor 27 produces an output pulse when the crankangle of, for example, No. 1 cylinder 1a reaches top dead center in the intake stroke, and this output pulse is put into the input port 35. A crankangle sensor 28 produces an output pulse, for example, every revolution of 30 degrees of the crankshaft, and this output pulse is put into the input port 35. In the CPU 34, the current crankangle is calculated from the output pulse of the TDC sensor 27 and the output pulse of the crankangle sensor 28, and the engine speed is calculated from the output pulses of the crankangle sensor 28. The output port 36 is connected to the first fuel injectors 11a, the second fuel injectors 11b and the step motors 19 and 22 via corresponding drive circuits 38.

Figure 7:
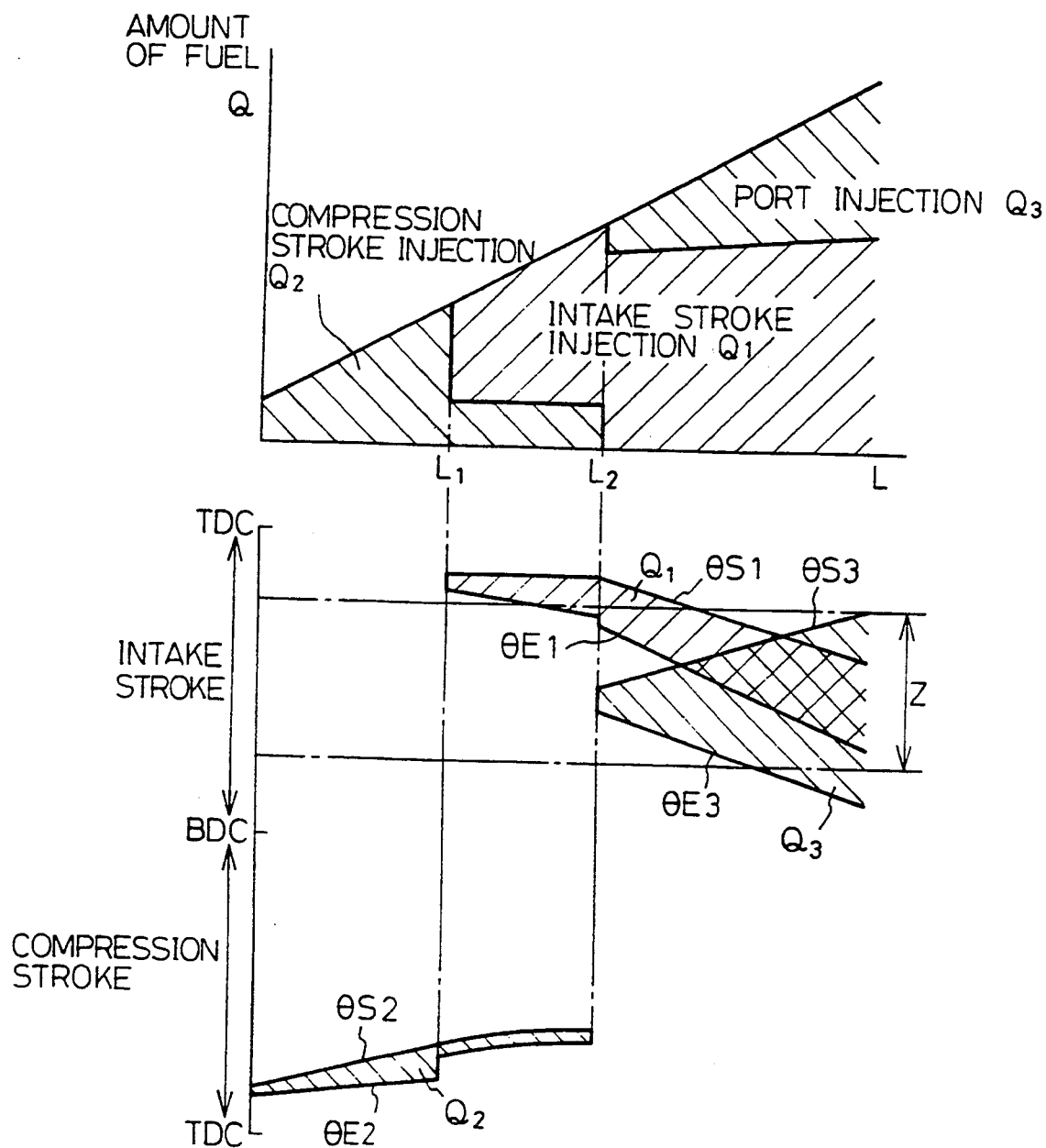
FIG. 7 is a view illustrating the amount of injection fuel and the injection time.

In the embodiment according to the present invention, fuel is injected by the first fuel injector 11a in two directions as illustrated by $F_1$ and $F_2$ in FIGS. 2 and 3, and fuel is injected by the second fuel injector 11b into the second intake port 7b as illustrated by $F_3$ in FIG. 2. FIG. 7 illustrates the amount of fuel injected and the injection time of the first fuel injector 11a and the second fuel injector 11b. In FIG. 7, L indicates the depression of the accelerator pedal 25.

As can be seen from FIG. 7, when the engine is operating under a light load wherein the depression L of the accelerator pedal 25 is smaller than $L_1$, the amount of fuel $Q_2$ is injected by the first fuel injector 11a into the combustion chamber 5 at the end of the compression stroke. In addition, when the engine is operating under a middle load wherein the depression L of the accelerator pedal 25 is between $L_1$ and $L_2$, the amount of fuel $Q_1$ is injected by the first fuel injector 11a into the combustion chamber 5 in the intake stroke, and then the amount of fuel $Q_2$ is injected by the first fuel injector 11a into the combustion chamber 5 at the end of the compression stroke. Namely, when the engine is operating under a middle load, the fuel is injected twice by the first fuel injector 11a into the combustion chamber 5 in the intake stroke and at the end of the compression stroke. Furthermore, when the engine is operating under a heavy load wherein the depression L of the accelerator pedal 25 is larger than $L_2$, the amount of fuel $Q_1$ is injected by the first fuel injector 11a into the combustion chamber 5 in the compression stroke, and the amount of fuel $Q_3$ is injected by the second fuel injector 11b into the second intake port 7b in the intake stroke. Namely, when the engine is operating under a heavy load, the fuel is injected by both the first fuel injector 11a and the second fuel injector 11b at almost the same point in the intake stroke.

Note that, in FIG. 7, $\theta S1$ and $\theta E1$ indicate the injection start time and the injection completion time, respectively, of the fuel injection $Q_1$ which is carried out by the first fuel injector 11a in the intake stroke, and $\theta S2$ and $\theta E2$ indicate the injection start time and the injection completion time, respectively, of the fuel injection $Q_2$ that is carried out by the first fuel injector 11a at the end of the compression stroke. In addition, $\theta S3$ and $\theta E3$ indicate the injection start time and the injection completion time, respectively, of the fuel injection $Q_3$ that is carried out by the second fuel injector 11b during the intake stroke.

In the embodiment according to the present invention, as illustrated in FIG. 2, the fuel streams $F_1$ and $F_2$ are injected by the first fuel injector 11a so that they move forward beneath the first intake valve 6a, and the fuel streams $F_1$ and $F_2$ impinge upon the rear face of the valve head of the first intake valve 6a at the time of the intake stroke injection carried out when the engine is operating under a heavy load. This will be described next in reference to FIGS. 8 and 9.

FIG. 8 illustrates the valve lift X of both the first intake valve 6a and the second intake valve 6b and the valve lift Y of the exhaust valves 8. As can be seen from FIG. 8, the valve lift X of the first intake valve 6a and the second intake valve 6b is maximum at the central portion of the intake stroke.

Figure 9A:
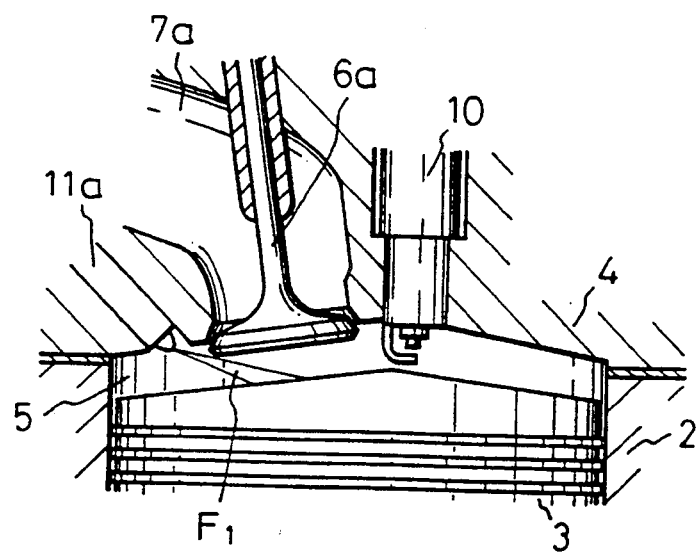
FIGS. 9A and 9B are cross-sectional side views of the engine, taken along the same cross-section as in FIG. 5.
Figure 9B:
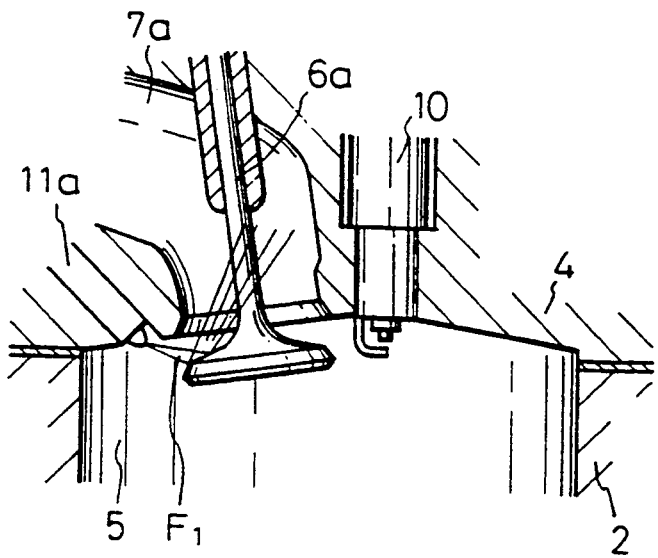

FIGS. 9A and 9B illustrate the relationship between the first intake valve 6a and the injected fuel stream $F_1$. As illustrated in FIGS. 9A and 9B, the fuel stream $F_1$ is injected slightly downward relative to the horizontal plane. In addition, the fuel stream $F_2$ (not shown in FIGS. 9A and 9B) is also injected slightly downward relative to the horizontal plane. As can be seen from FIGS. 9A and 9B, the relative position between the first intake valve 6a and the first fuel injector 11a and the injecting direction of fuel injected by the first fuel injector 11a are determined so that the injected fuel stream $F_1$ does not impinge upon the first intake valve 6a when the amount of valve lift of the first intake valve 6a is small as illustrated in FIG. 9A, and the injected fuel stream $F_1$ impinges upon the rear face of the valve head of the first intake valve 6a when the amount of valve lift of the first intake valve 6a becomes large as illustrated in FIG. 9B. Z in FIG. 8 indicates a crankangle region in which the injected fuel stream $F_1$ impinges upon the rear face of the valve head of the first intake valve 6a. In addition, the injected fuel stream $F_2$ (not shown in FIGS. 9A and 9B) also impinges upon the rear face of the valve head of the first intake valve 6a in this crankangle region Z.

As mentioned above, if fuel is injected by the first fuel injector 11a in the crankangle region Z illustrated in FIG. 8, the fuel stream $F_1$ thus injected impinges upon the rear face of the valve head of the first intake valve 6a as illustrated in FIG. 9B. At this time, if the velocity of the injected fuel $F_1$ is low, the injected fuel $F_1$ moves forward along the rear face of the valve head of the first intake valve 6a and then moves toward the peripheral portion of the combustion chamber 5, which is located opposite the first fuel injector 11a, after the injected fuel $F_1$ impinges upon the rear face of the valve head of the first intake valve 6a. However, if the velocity of the injected fuel $F_1$ is high, the injected fuel $F_1$ is reflected and moves forward to the first intake port 7a after it impinges upon the rear face of the valve head of the first intake valve 6a, as illustrated in FIG. 9B. Similarly, if the velocity of the injected fuel $F_2$ is high, the injected fuel $F_2$ is reflected and moves forward to the first intake port 7a after it impinges upon the rear face of the valve head of the first intake valve 6a.

In the embodiment according to the present invention, the velocities of both injected fuels $F_1$ and $F_2$ are determined so that the injected fuels $F_1$ and $F_2$ move forward to the first intake port 7a after they are reflected on the rear face of the valve head of the first intake valve 7a. In this case, the velocities of both injected fuels $F_1$ and $F_2$ are mainly determined by fuel injection pressure and, in the embodiment according to the present invention, the fuel injection pressure of the first fuel injector 11a is set at more than 70 Kg/cm$^2$. Conversely, the fuel injection pressure of the second fuel injector 11b is set considerably lower than 70 Kg/cm$^2$.

Figure 10:
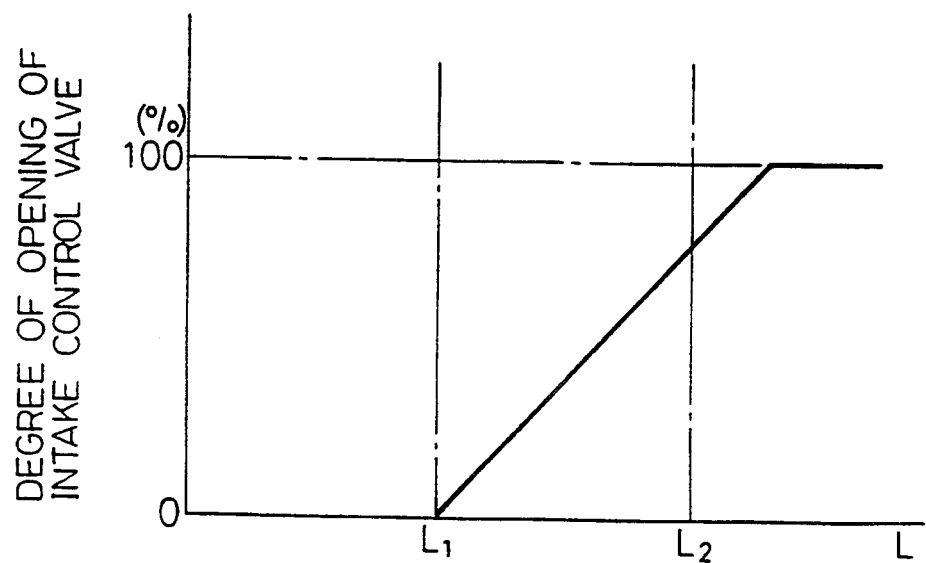
FIG. 10 is a diagram illustrating the degree of opening of the intake control valve.

FIG. 10 illustrates the relationship between the degree of opening of the intake control valve 17 and the depression L of the accelerator pedal 25. As illustrated in FIG. 10, when the engine is operating under a light load wherein the depression L of the accelerator 25 is smaller than $L_1$, the intake control valve 17 is maintained at the closed position and, when the depression L of the accelerator pedal 25 becomes larger than $L_1$, the degree of opening of the intake control valve 17 becomes large as the depression L of the accelerator pedal 25 becomes large. When the intake control valve 17 is closed, air flows, while swirling, into the combustion chamber 5 via the helically shaped first intake port 7a, and thus a strong swirl motion, as illustrated by the arrow S in FIG. 2, is created in the combustion chamber 5. Conversely, when the intake control valve 17 is open, air flows into the combustion chamber 5 also from the second intake port 7b.

In FIG. 7, the crankangle region Z, illustrated in FIG. 8, is shown. As can be seen from FIG. 7, when the engine is operating under a heavy load, fuel injection $Q_1$ by the first fuel injector 11a is carried out in the crankangle region Z during almost the entire heavy load operating state of the engine. Accordingly, when the engine is operating under a heavy load, the entire fuel injected by the first fuel injector 11a flows into tire first intake port 7a after it impinges upon the rear face of the valve head of the first intake valve 6a.

Conversely, when the engine is operating under a middle load, the injection time of the first fuel injection $Q_1$ by the first fuel injector 11a is advanced, compared with the case wherein the engine is operating under a heavy load, and at this time, the first fuel injection $Q_1$ by the first fuel injector 11a is carried out before the crankangle reaches the crankangle region Z during the entire middle load operating state of the engine. If the fuel injection is carried out at a crankangle before the crankangle region Z, the injected fuel stream $F_1$ moves forward without impinging upon the first intake valve 6a.

Figure 11A:
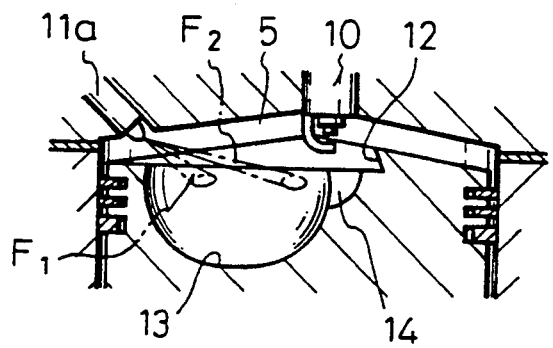
FIGS. 11A to 11C are views illustrating the combustion method under engine light load operation conditions.
Figure 11B:
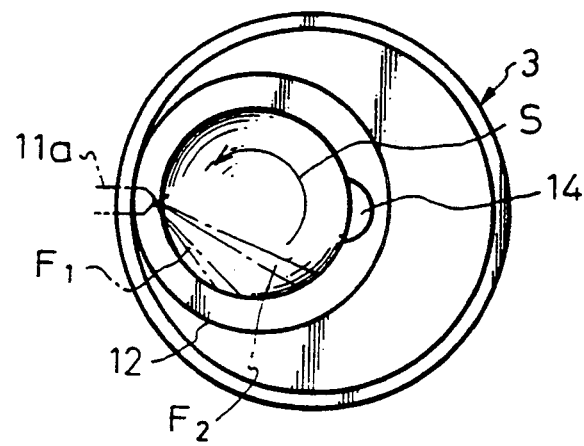
Figure 11C:
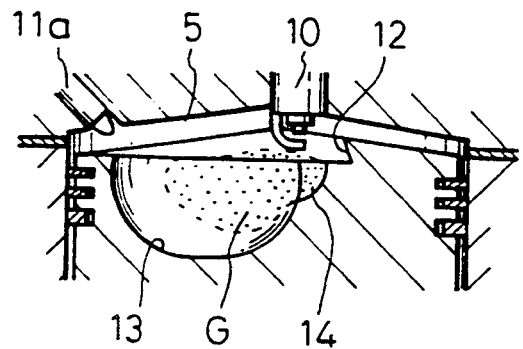
Figure 12A:
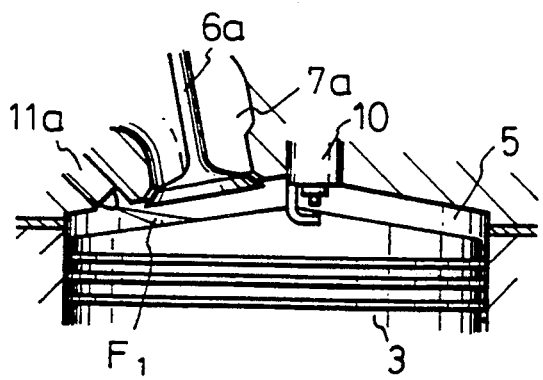
FIGS. 12A to 12D are views illustrating the combustion method under engine middle load operation conditions.
Figure 12B:
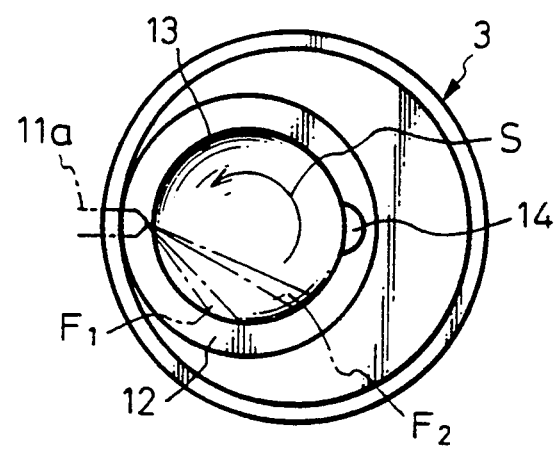
Figure 12C:
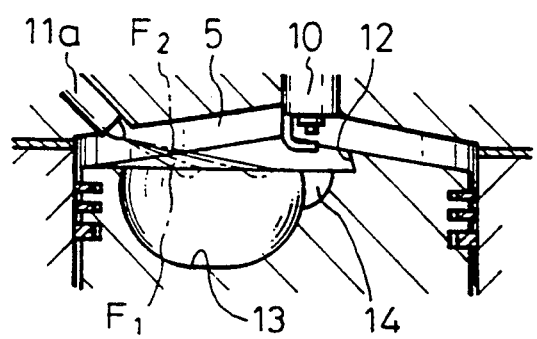
Figure 12D:
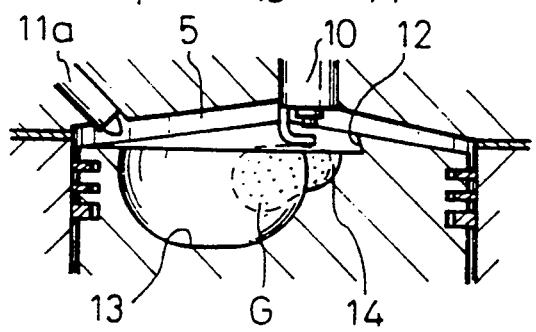
Figure 13A:
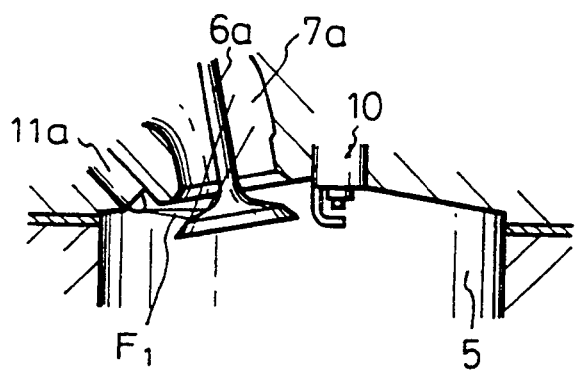
FIGS. 13A and 13B are views illustrating the combustion method under engine heavy load operation conditions.
Figure 13B:
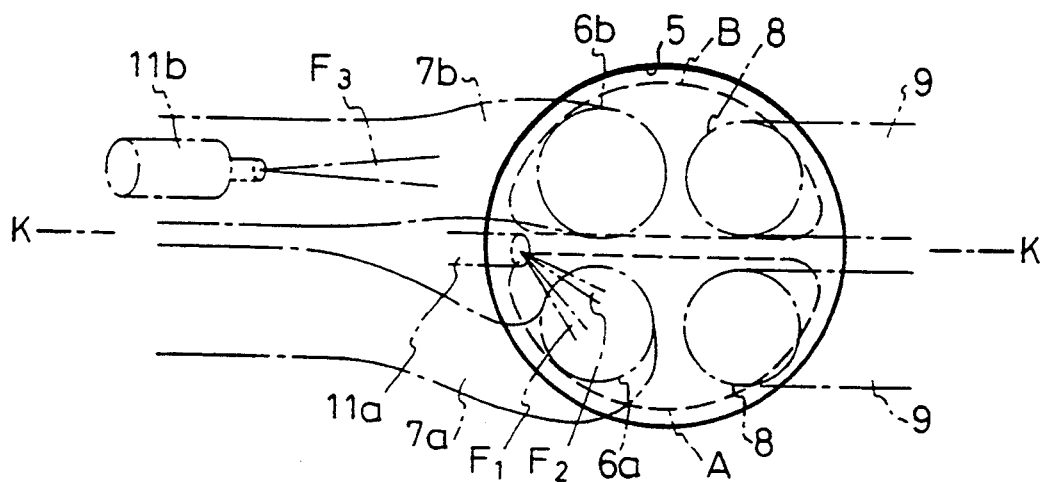

Next, the combustion method will be described with reference to FIGS. 7, and 11A to 13B. Note that FIGS. 11A to 11C illustrate the combustion method under a light load operating state of the engine; FIGS. 12A to 12D illustrate the combustion method under a middle load operating state of the engine; and FIGS. 13A and 13B illustrate the combustion method under a heavy load operating state of the engine.

As illustrated in FIG. 7, when the engine is operating under a light load wherein the depression L of the accelerator pedal 25 is lower than $L_1$, fuel is injected by the first fuel injector 11a into the combustion chamber 5 at the end of the compression stroke. At this time, as illustrated in FIGS. 11A and 11B, the injected fuel streams $F_1$ and $F_2$ impinge upon the circumferential wall of the deep dish portion 13. In this case, the amount of injected fuel $Q_2$ is increased as the depression L of the accelerator pedal 25 becomes large, as illustrated in FIG. 7. The fuel that impinges upon the circumferential wall of the deep dish portion 13 spreads, while being vaporized by the swirl motion S, and thereby an air-fuel mixture G is formed in the recessed portion 14 and the deep dish portion 13, as illustrated in FIG. 11C. Then, the air-fuel mixture G is ignited by the spark plug 10.

When the engine is operating under a middle load wherein the depression L of the accelerator pedal 25 is between $L_1$ and $L_2$ in FIG. 7, the first fuel injection $Q_1$ by the first fuel injector 11a is started in the intake stroke at a crankangle before the crankangle region Z, and then the second fuel injection $Q_2$ by the first fuel injector 11a is carried out at the end of the compression stroke. Namely, the first fuel injection by the first fuel injector 11a is initially carried out at the beginning of the intake stroke, but at this time, the injected fuel streams $F_1$ and $F_2$ impinge upon the circumferential wall of the deep dish portion 13 without impinging upon the first intake valve 6a, as illustrated in FIGS. 12A and 12B. A large part of the fuel impinging upon the circumferential wall of the deep dish portion 13 continues to stay in the deep dish portion 13 during the time the piston 3 moves downward. Accordingly, when the piston 3 moves upward, and the engine stroke reaches the end of the compression stroke, an air-fuel mixture is collected in the deep dish portion 13 and in the periphery thereof.

Then, the second fuel injection by the first fuel injector 11a is carried out at the end of the compression stroke. As can be seen from FIG. 7, when the engine is operating under a middle load, the injection time of the compression stroke injection $Q_2$ is slightly advanced, compared with the case wherein the engine is operating under a light load. Accordingly, at this time, the fuel is injected toward both the deep dish portion 13 and the shallow dish portion 12 as illustrated in FIG. 13C, and an ignitable air-fuel mixture forming an ignition source is formed in the recessed portion 14 and the deep dish portion 13 by this injected fuel, as illustrated in FIG. 13D.

The air-fuel mixture G is ignited by the spark plug 10, and the air-fuel mixture formed by the first fuel injection $Q_1$ is ignited by the flame of the ignited air-fuel mixture G. Since the air-fuel mixture formed by the first fuel injection $Q_1$ is collected around the deep dish portion 13 as mentioned above; this air-fuel mixture does not become extremely lean. Accordingly, since a flame rapidly propagates in this air-fuel mixture, good combustion can be obtained. In this case, since the fuel injected at the end of the compression stroke is used mainly for ignition only, the amount of fuel $Q_2$ injected at the end of the compression stroke remains constant regardless of the depression L of the accelerator pedal 25 when the engine is operating under a middle load, as illustrated in FIG. 7. Conversely, the amount of fuel $Q_1$ injected at the beginning of the intake stroke is increased as the depression L of the accelerator pedal 25 increases.

When the engine is operating under a heavy load wherein the depression L of the accelerator pedal 25 is larger than $L_2$ in FIG. 7, fuel is injected by the first fuel injector 11a in the crankangle region Z during the intake stroke and, in addition, fuel is also injected by the second fuel injector 11b at almost the same time. Accordingly, at this time, fuel is injected by the first fuel injector 11a toward the rear face of the valve head of the first intake valve 6a as illustrated in FIG. 13A, and the injected fuel is reflected on the rear face of the valve head of the first intake valve 6a and flows into the first intake port 7a. Then, the injected fuel flows again into the combustion chamber 5 together with air. In this case, the amount of fuel $Q_1$ injected by the first fuel injector 11a increases slightly as the depression L of the accelerator pedal 25 increases, as illustrated in FIG. 7.

The fuel injected by the second fuel injector 11b into the second intake port 7b flows into the combustion chamber 5 via the second intake valve 6b. In this case, the amount of fuel $Q_3$ injected by the second fuel injector 11b is increased as the depression L of the accelerator pedal 25 increases, as illustrated in FIG. 7.

When the injected fuel reflected on the rear face of the valve head of the first intake valve 6a flows into the first intake port 7a as illustrated in FIG. 13A, the injected fuel is mixed with air in the first intake port 7a, and then the injected fuel and air, which are sufficiently mixed, are fed into the combustion chamber 5. Namely, a mixture of fuel and air, which are mixed in advance in the first intake port 7a, similar to the air-fuel mixture fed from the second intake port 7b, is fed into the combustion chamber 5 via the first intake valve 6a.

When the engine is operating under a heavy load, since the intake control valve 17 is fully opened as mentioned above, air is fed into the combustion chamber 5 from both the first intake port 7a and the second intake port 7b. At this time, the swirling air that flows into the combustion chamber 5 from the first intake port 7a is blocked in the combustion chamber 5 by the air stream flowing from the second intake port 7b, and thus, a swirling motion is not created in the combustion chamber 5. At this time, the region A of the combustion chamber 5, which is located on the first intake valve 6a side of the plane K—K as illustrated in FIG. 13B, is occupied by the air flowing from the first intake port 7a, and the region B of the combustion chamber 5, which is located on the second intake valve 2b side of the plane K—K, is occupied by the air flowing from the second intake port 7b. In other words, an air-fuel mixture is formed in the region A by the fuel injected by the first fuel injector 11a, and an air-fuel mixture is formed in the region B by the fuel injected by the second fuel injector 11b.

In this case, of course, the air-fuel mixture formed by the fuel injected by the first fuel injector 11a and the air-fuel mixture formed by the fuel injected by the second fuel injector 11b are not completely divided on each side of the plane K—K, but the air-fuel mixtures formed by the fuels injected by the first fuel injector 11a and the second fuel injector 11b occupy the region A and the region B, respectively, without overlapping each other. As a result, the air-fuel mixture is distributed over the entire space of the combustion chamber 5, and all of the air in the combustion chamber 5 can be used for combustion. In addition, an extremely rich mixture region and an extremely lean mixture region are not formed in the combustion chamber 5, and thus good combustion and a high engine power output can be obtained.

In the embodiment hereinbefore described, the fuel injected by the first fuel injector 11a impinges upon the first intake valve 6a. However, even if the fuel injected by the first fuel injector 11a does not impinge upon the first intake valve 6a, but is directed to the region A in the combustion chamber 5, since the air-fuel mixture is formed in the region A by this injected fuel, it is possible to distribute the air-fuel mixture over the entire space in the combustion chamber 5.

In the embodiment according to the present invention, as mentioned above, the velocity of fuel injected by the first fuel injector 11a is increased so that the fuel injected by the first fuel injector 11a flows into the first intake port 7a after it is reflected on the first intake valve 6a. In this case, since the injected fuel impinges upon the rear face of the valve head of the first intake valve 6a at a high speed, the injected fuel is atomized upon impingement, and thus the atomized fuel moves forward to the first intake port 7a. At this time, since the moving direction of the fuel is opposite the flow direction of the inflow air, the fuel is subjected to a strong shearing force by the inflow air, and thus the fuel is further atomized. As mentioned above, since the injected fuel is atomized upon impingement and then atomized because of the strong shearing force, good atomization of the injected fuel can be obtained. Therefore, it is possible to obtain further good combustion by causing the injected fuel to impinge upon the rear face of the valve head of the first intake valve 6a.

In the embodiment according to the present invention, the injection start time $\theta S1$ of the intake stroke injection $Q_1$ by the first fuel injector 11a, the injection start time $\theta S2$ of the compression stroke injection $Q_2$ by the first fuel injector 11a, and the injection start time $\theta S3$ of the injection by the second fuel injector 11b, which are illustrated in FIG. 7, are determined in advance and stored in the ROM33 as a function of the depression L of the accelerator pedal 25. Accordingly, the injection completion times $\theta E1$, $\theta E2$ and $\theta E3$ are controlled on the basis of the amount of fuel $Q_1$, $Q_2$ and $Q_3$ to be injected, respectively.

Figure 14:
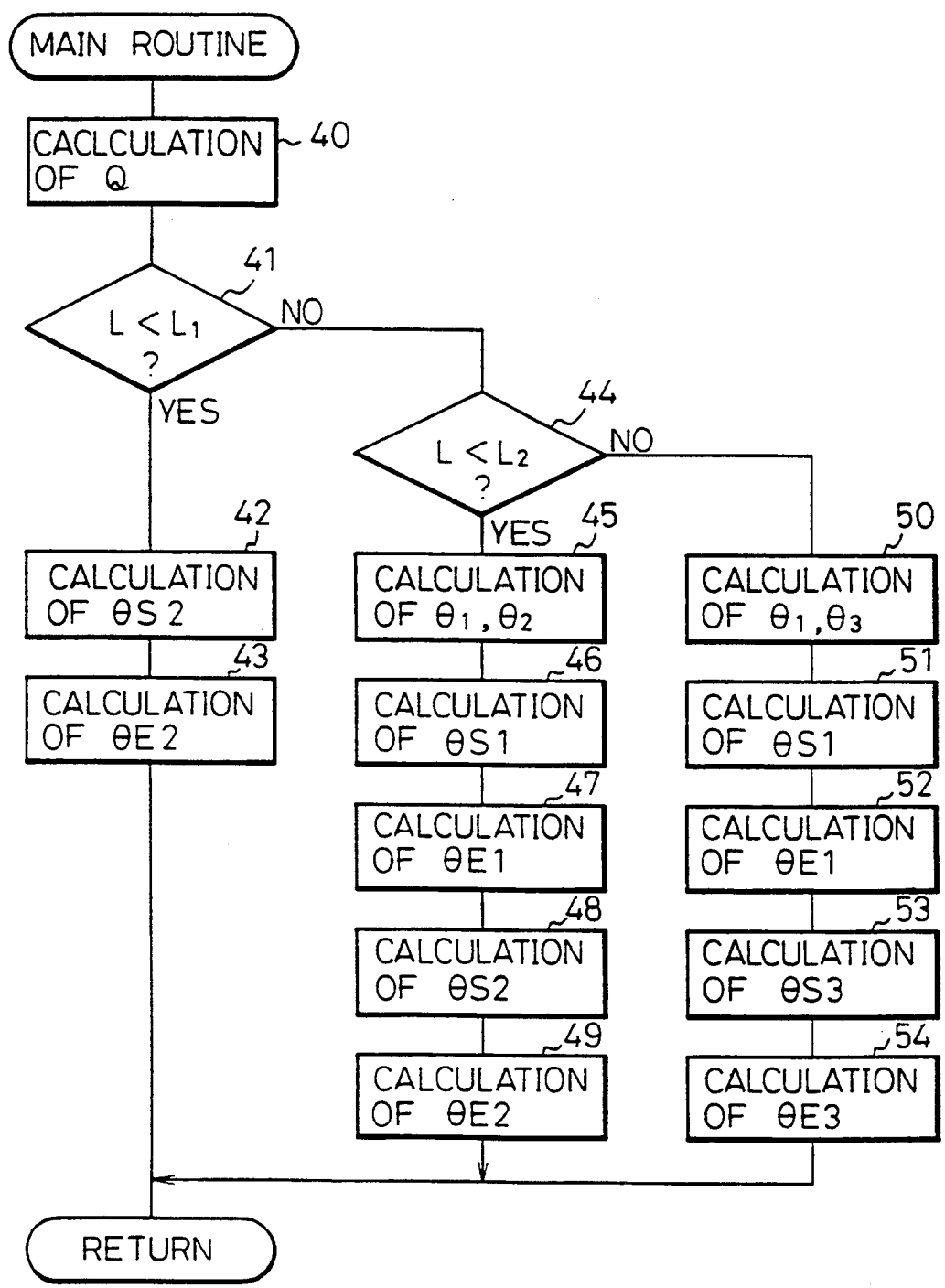
FIG. 14 is a flow chart for executing a main routine.

FIG. 14 illustrates a routine for controlling the fuel injection, and this routine is repeatedly executed.

Referring to FIG. 14, in step 40, the amount of fuel Q is calculated. This amount fuel Q is stored in advance in the ROM 33 as a function of the engine speed N and the depression L of the accelerator pedal 25, as illustrated in FIG. 15. Then, in step 41, it is determined whether or not the depression L of the accelerator pedal 25 is smaller than $L_2$, i.e., the engine is operating under a light load. If $L < L_1$, the procedure goes to step 42, and the injection start time $\theta S2$ of the compression stroke injection by the first fuel injector 11a is calculated. Then, in step 43, the injection completion time $\theta E2$ is calculated from the injection start time $\theta S2$, the amount of fuel Q and the engine speed N.

When it is determined in step 41 that $L \geq L_1$, the procedure goes to step 44, and it is determined whether or not the depression L of the accelerator pedal 25 is smaller than $L_2$, i.e., the engine is operating under a middle load. When the engine is operating under a middle load, the procedure goes to step 45, and the amount of intake stroke injection $Q_1$ and the amount of compression stroke injection $Q_2$ by the first fuel injector 11a are calculated. Then, in step 46, the injection start time $\theta S1$ of the intake stroke injection is calculated. Then, in step 47, the injection completion time $\theta E1$ is calculated from the injection start time $\theta S1$, the amount of intake stroke injection $Q_1$ and the engine speed N. Then, in step 48, the injection start time $\theta S2$ of the compression stroke injection is calculated. Then, in step 49, the injection completion time $\theta E2$ is calculated from the injection start time $\theta S2$, the amount of compression stroke injection $Q_2$ and the engine speed N.

When it is determined in step 44 that $L \geq L_2$, i.e., when the engine is operating under a heavy load, the procedure goes to step 50, and the amount of intake stroke injection $Q_1$ by the first fuel injector 11a and the amount of injection $Q_3$ by the second fuel injector 11b are calculated. Then, in step 51, the injection start time $\theta S1$ of the intake stroke injection by the first fuel injector 11a is calculated. Then, in step 52, the injection completion time $\theta E1$ is calculated from the injection start time $\theta S1$, the amount of intake stroke injection $Q_1$ and the engine speed N. Then, in step 53, the injection start time $\theta 3$ of the injection by the second fuel injector 11b is calculated. Then, in step 54, the injection completion time $\theta E3$ is calculated from the injection start time $\theta S3$, the amount of injection $Q_3$ and the engine speed N. The injection of fuel by each fuel injector 11a, 11b is carried out on the basis of the injection start times $\theta S1$, $\theta S2$, $\theta S3$ and the injection completion times $\theta E1$, $\theta E2$, $\theta E3$ thus calculated.

According to the present invention, even when one of the fuel injectors is arranged in the combustion chamber, and the other fuel injector is arranged in the intake port, the air-fuel mixtures formed by fuel injected by both fuel injectors can be distributed over the entire interior of the combustion chamber, and thus the entire air in the combustion chamber can be used for combustion.

While the invention has been described by reference to a specific embodiment chosen for purposes of illustration, it should be apparent that numerous modifications could be made thereto by those skilled in the art without departing from the basic concept.

I claim:

1. An engine having a cylinder head and a combustion chamber, the engine comprising:
  a first intake valve arranged on an inner wall of the cylinder head;
  a fuel injector arranged on the inner wall of the cylinder head, wherein an injection direction of the fuel injector is determined so that the fuel injected by the fuel injector impinges upon a rear face of the valve head of the first intake valve when the amount of valve lift of the first intake valve exceeds a predetermined amount, and wherein the fuel injected by the fuel injector moves toward the combustion chamber beneath the first intake valve when the amount of valve lift of the first intake valve is smaller than the predetermined amount; and
  injection control means for controlling an injection timing and an amount of fuel injected by the fuel injector during an intake stroke of the engine, wherein the injection control means operates to increase a ratio of an amount of injected fuel impinging upon the rear face of the valve head of the first intake valve to an amount of injected fuel moving toward the combustion chamber beneath the first intake valve as an engine load increases.

2. An engine according to claim 1, wherein the injection control means alters an injection time to increase the ratio as the engine load increases.

3. An engine according to claim 2, wherein the injection control means retards the injection time to increase the ratio as the engine load increases.

4. An engine according to claim 1, wherein the injection control means increases the amount of fuel injected by the fuel injector during the intake stroke to increase the ratio as the engine load increases.

5. An engine according to claim 1, wherein an injection pressure of the fuel injector is determined so that, when the fuel injected by the fuel injector impinges upon the rear face of the valve head of the first intake valve, the fuel is reflected off of the rear face of the valve head and flows into an intake port of the first intake valve.

6. An engine according to claim 1, wherein the injection pressure of the fuel injector is higher than 70 kg/cm$^2$.

7. An engine according to claim 1, further comprising a piston having a cavity formed on a top face thereof, wherein injected fuel moving toward the combustion chamber beneath the first intake valve is fed into the cavity.

8. An engine according to claim 7, wherein the cavity includes a shallow, dish-shaped portion and a deep, dish-shaped portion, wherein the deep, dish-shaped portion is formed in a central portion of the shallow, dish-shaped portion.

9. An engine according to claim 8, further including a spark plug arranged at a central portion of the inner wall of the cylinder head, wherein the fuel injector is arranged on a periphery of an inner wall of a cylinder head of the engine, and wherein the cavity extends from a point beneath the fuel injector to a point beneath the spark plug, a recessed portion being formed on a portion of the cavity connecting the shallow, dish-shaped portion and the deep, dish-shaped portion at a position beneath the spark plug.

10. An engine according to claim 7, wherein the injection control means controls the fuel injector to inject fuel during the intake stroke when the engine load is within a range extending from a predetermined lower load to a full load, and wherein all of the fuel injected by the fuel injector is fed into the cavity when the engine load is within a lower load portion of the range, and wherein all of the fuel injected by the fuel injector impinges upon the rear face of the valve head of the first intake valve when the engine load is in a higher load portion of the range.

11. An engine according to claim 10, wherein the injection control means controls the fuel injector to inject fuel toward the cavity at the end of a compression stroke of the engine when the engine load is higher than the predetermined lower load and lower than a predetermined higher engine load.

12. An engine according to claim 10, wherein the injection control means controls the fuel injectors to inject fuel toward the cavity when the engine load is lower than the predetermined lower load.

13. An engine according to claim 1, further comprising a second intake valve, a first intake passage connected to the combustion chamber via the first intake valve and a second intake passage connected to the combustion chamber via the second intake valve, wherein the first intake passage includes a helical intake port formed in the cylinder head and wherein the second intake passage includes a substantially straight intake port formed in the cylinder head.

14. An engine according to claim 13, wherein an intake control valve is arranged in the second passage and is closed when an engine load is lower than a predetermined intake control valve activating load, wherein the intake control valve is open when the engine load is higher than the predetermined intake control valve activating load.

* * * * *